United States Patent
Kweon et al.

(10) Patent No.: US 7,358,633 B2
(45) Date of Patent: Apr. 15, 2008

(54) LINEAR VIBRATION MOTOR USING RESONANCE FREQUENCY

(75) Inventors: Soon Do Kweon, Seoul (KR); Il Oung Park, Seoul (KR); Yeon Ho Son, Kyungki-do (KR); Joon Choi, Kyungki-do (KR); Hwa Young Oh, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 397 days.

(21) Appl. No.: 10/870,910

(22) Filed: Jun. 21, 2004

(65) Prior Publication Data
US 2005/0184601 A1 Aug. 25, 2005

(30) Foreign Application Priority Data
Feb. 23, 2004 (KR) ............... 10-2004-0011907
Mar. 30, 2004 (KR) ............... 10-2004-0021673

(51) Int. Cl.
*H02K 7/06* (2006.01)
(52) U.S. Cl. ...................................... 310/81
(58) Field of Classification Search .......... 310/81, 310/12–15; 381/396; 340/388.1
See application file for complete search history.

(56) References Cited

U.S. PATENT DOCUMENTS

| | | | | |
|---|---|---|---|---|
| 4,728,934 A | * | 3/1988 | Pfander et al. | 381/326 |
| 5,184,037 A | * | 2/1993 | Kobayashi et al. | 310/26 |
| 5,230,616 A | * | 7/1993 | Serizawa et al. | 418/151 |
| 5,528,697 A | * | 6/1996 | Saito | 381/396 |
| 5,682,132 A | * | 10/1997 | Hiroyoshi et al. | 340/407.1 |
| 5,861,686 A | * | 1/1999 | Lee | 310/36 |
| 5,894,263 A | * | 4/1999 | Shimakawa et al. | 340/388.1 |
| 6,060,804 A | * | 5/2000 | Fujita et al. | 310/81 |
| 6,229,903 B1 | * | 5/2001 | Kobayashi | 381/410 |
| 6,377,145 B1 | * | 4/2002 | Kumagai | 310/81 |
| 6,487,300 B1 | * | 11/2002 | Lee et al. | 381/396 |
| 6,590,991 B1 | * | 7/2003 | Maeda | 381/409 |
| 7,038,335 B2 | * | 5/2006 | Choi et al. | 310/12 |
| 2003/0123692 A1 | * | 7/2003 | Ueki | 381/398 |
| 2006/0270488 A1 | * | 11/2006 | Takeuchi | 473/300 |

FOREIGN PATENT DOCUMENTS

KR 1998-32013 7/1998

* cited by examiner

*Primary Examiner*—Dang Le
*Assistant Examiner*—Nguyen Hanh
(74) *Attorney, Agent, or Firm*—Lowe Hauptman Ham & Berner

(57) ABSTRACT

A linear vibration motor comprising a movable unit, a base assembly having a coil assembly, a housing and an elastic member, in which the movable unit has the maximum mass from a fixed housing volume. The elastic member has the outer periphery fixed to the ceiling of the housing and the inner periphery fixed to the top of the movable unit opposed to the outer periphery. The elastic member is deformable to the extent that the outer and inner peripheries are shift to a coplanar position from a parallel position where they are spaced for a predetermined distance from each other. The core assembly is distanced downward from the movable unit or a predetermined gap.

6 Claims, 6 Drawing Sheets

LINEAR VIBRATION MOTOR USING RESONANCE FREQUENCY

CLAIM OF PRIORITY

This application claims the benefit of Korean Patent Application No. 2004-11907 filed on Feb. 23, 2004 and No. 2004-21673 filed on Mar. 30, 2004, in the Korean Intellectual Property Office, the disclosure of which is incorporated herein by reference.

BACKGROUND OF THE INVENTION

1. Field of the Invention

The present invention relates to a linear vibration motor using resonance frequency. More particularly, in a vertical vibrator which does not use a conventional vibration motor mechanism based upon brushes and a commutator, the linear vibration motor of the invention can minimize the volume of an elastic member except for the route of movement in order to maximize the amplitude of vibration in a fixed volume.

2. Description of the Related Art

Communication instruments generally have a call receiving function as one of their essential functions. Typically, the call receiving function generates sound such as a melody and bell or vibrates corresponding communication instruments.

Since the melody or bell may disturb others when transferred to the outside via a speaker, the vibration function is used generally to avoid this situation. In order to enable the vibration function, a small sized vibration motor is generally actuated transferring a driving force to a housing of a communication instrument thereby to vibrate the same.

Vibration motors currently utilized in mobile phones are classified into thin coin and elongate bar types according to their configurations.

FIG. 1 is a perspective exploded view illustrating a conventional coin type vibration motor in detail, which will be described as follows.

A coin type vibration motor 100 generally includes a stator assembly 110 in the form of a stationary member and a rotor assembly 120 in the form of a rotary member.

The stator assembly 110 has a bracket 111 in the form of a circular plate, a lower board 112 attached on the top of the bracket 111 and an annular magnet 113 concentrically attached on the top of the bracket 111 around the lower board 112 in the same fashion.

The bracket 111 is enclosed by a housing 150 from above, and a central shaft 130 is connected between the bracket 111 and the housing 150.

The rotor assembly 120 is rotatably placed around the shaft 130, and has a bearing 121, a coil assembly 122, a counter weight 123, a commutator 124, an upper board 125 and an insulator 126.

The stator assembly 110 is electrically connected to the rotor assembly 120 via brushes 140 that are fixed at the bottom ends to the lower board 112 and the top ends to the commutator 124.

FIG. 2 is a sectional view of a conventional bar type vibration motor, which will be described as follows.

A bar type vibration motor 200 generally includes a stator assembly 210 and a rotor assembly 220.

The stator assembly 210 has a body 211, a stationary cap 212 fixed to the body 211 and a magnet 213 fixed to the body 211. The body 211 is of a hollow cylindrical member, and fixedly houses the magnet 213 therein.

The rotor assembly 220 has an eccentric weight 223, a stationary member 225, a commutator 224, which is fixedly attached on one side of the stationary member 225 and divided into a plurality of segments, and a plurality of coil assemblies 222 fixed to the stationary member 225.

A lower board (not shown) mounted on the stationary cap 212 has a pair of brushes 240 fixed thereto, in which the brushes 240 are connected to power-supplying lead wires 214 and contact the commutator 224 to apply voltage thereto.

Regardless of their designs, the above vibration motors generate rotational force to turn a rotary unit having an unbalanced mass thereby obtaining mechanical vibration, in which the rotational force is generally produced by supplying voltage to a rotor coil through the commutation by contacts of the brushes and the commutator.

Unfortunately, a brush type vibration motor incorporating such a commutator has following problems: In the rotation of the motor, brushes passing through a gap between segments of a commutator creates mechanical friction and an electric spark so that the brushes and the commutator are abraded to shorten the lifetime of the motor.

As a vertical vibrator in the form of a brushless vibration motor for overcoming some drawbacks of such a brush type vibration motor, a portable vibrator is proposed in Japanese Patent Publication Serial No. 2003-117489. The vertical vibrator is illustrated in FIG. 3, and will be described herein as follows.

A cylindrical frame 410 is provided at axial ends with a pair of brackets for supporting both ends of a stationary shaft, and a cylindrical coil 420 having terminals is fixed to the inner periphery of the cylindrical frame 410. A cylindrical permanent magnet 430 is radially magnetized, and elastic members 440 are fixed coplanar with the permanent magnet 430.

Generally in a vibration motor using resonance frequency, the amplitude of vibration F is expressed as Equation 1 below:

$$F \propto M \cdot X \cdot f^2 \quad \text{Equation 1,}$$

wherein M is the mass of a vibrator, X is the displacement of the vibrator and $f^2$ is the square of resonance frequency.

That is, the amplitude of vibration increases in proportion to the mass of the vibrator in a fixed volume.

However, the portable vibrator 400 as shown in FIG. 3 also has following problems: The coil 420 is placed on the inside wall of the housing occupying a large space, and the elastic member is of a coil elastic member (i.e., an elastic member in which its plates are accumulated in thickness to occupy a volume if extruded to the maximum extent) so that the volume occupied by the elastic member except for the track drawn by its movement does not provide a space for increasing the volume of the vibrator in a fixed volume. That is, the mass of the vibrator cannot be maximized failing to maximize the amplitude of vibration in a fixed volume.

As a consequence, vibration motors using resonance frequency capable of preventing such problems have been required in the art.

SUMMARY OF THE INVENTION

The present invention has been made to solve the foregoing problems of the prior art and it is therefore an object of the present invention to provide a linear vibration motor designed to vibrate itself by using resonance frequency in order to improve lifetime and reliability in placement of a conventional brush type vibration motor which rotates a rotor unit having unbalanced mass via the commutation between brushes and a commutator to obtain mechanical vibration. Further, the linear vibration motor using resonance frequency of the invention can improve space efficiency over that of a conventional vertical vibrator structure in order to maximize the amplitude of vibration in a fixed volume.

According to an aspect of the invention for realizing the object, there is provided a linear vibration motor using resonance frequency, comprising: a movable unit having a magnet, a yoke for housing the magnet and a weight having a predetermined mass for surrounding the flank of the yoke; a base assembly placed under the movable unit, and having a coil assembly; a housing for covering the base assembly and the movable unit placed over the base assembly; and an elastic member being shaped as a leaf spring, the elastic member including an outer planar section fixed to a ceiling of the housing or a top of the base assembly, an inner planar section opposed to the outer planar section and connected to a top or bottom of the movable unit and at least two connecting sections for connecting the inner planar section with the outer planar section along curved lines, the inner planar section having a diameter matching about 15 to 70% of the outside diameter of the movable unit, and the elastic member being deformable to the extent that the inner and outer planar sections are shifted to a coplanar position from a parallel position where they are spaced for a predetermined distance from each other, whereby the movable unit vibrates vertically under the interaction between a magnetic force generated from the magnet and an electromagnetic force of a predetermined frequency generated from the coil assembly.

Preferably, the weight may have a specific gravity larger than that of iron, and the weight may be extended toward the base assembly at a bottom end formed in an outer periphery portion thereof, which does not correspond to the coil assembly, to increase the mass of the weight.

In addition, the linear vibration motor of the invention may further comprise magnetic fluid formed on the top or bottom of the movable unit, which is connected with the elastic member, to reduce contact noises generated from the vertical movement of the movable unit.

Preferably, the base assembly may have terminals capable of being connected with an external board, and the movable unit may have at least one hole to adjust the mass of thereof.

According to an aspect of the invention for realizing the object, there is provided a linear motor using resonance frequency, comprising: a housing made of a magnetic material; a magnet, a yoke placed under the magnet and providing a route for the passage of a line of magnetic force and a weight attached on a top of the magnet; an elastic member being shaped as a leaf spring, the elastic member including an outer planar section fixed to a ceiling of the housing or a top of the base assembly, an inner planar section opposed to the outer planar section and connected to a top or bottom of the movable unit and at least two connecting sections for connecting the inner planar section with the outer planar section along curved lines, the inner planar section having a diameter matching about 15 to 70% of the outside diameter of the movable unit, and the elastic member being deformable to the extent that the inner and outer planar sections are shifted to a coplanar position from a parallel position where they are spaced for a predetermined distance from each other; and a base assembly contacting a bottom of the housing and placed under the movable unit, whereby the movable unit vibrates vertically under the interaction between a magnetic force generated from the magnet and an electromagnetic force of a predetermined frequency generated from the coil assembly.

Preferably, the weight may have a specific gravity larger than that of iron.

In addition, the linear vibration motor of the invention may further comprise magnetic fluid formed on the top or bottom of the movable unit, which is connected with the elastic member, to reduce contact noises generated from the vertical movement of the movable unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the invention will now be described in detail with reference to the accompanying drawings.

Figure 4:
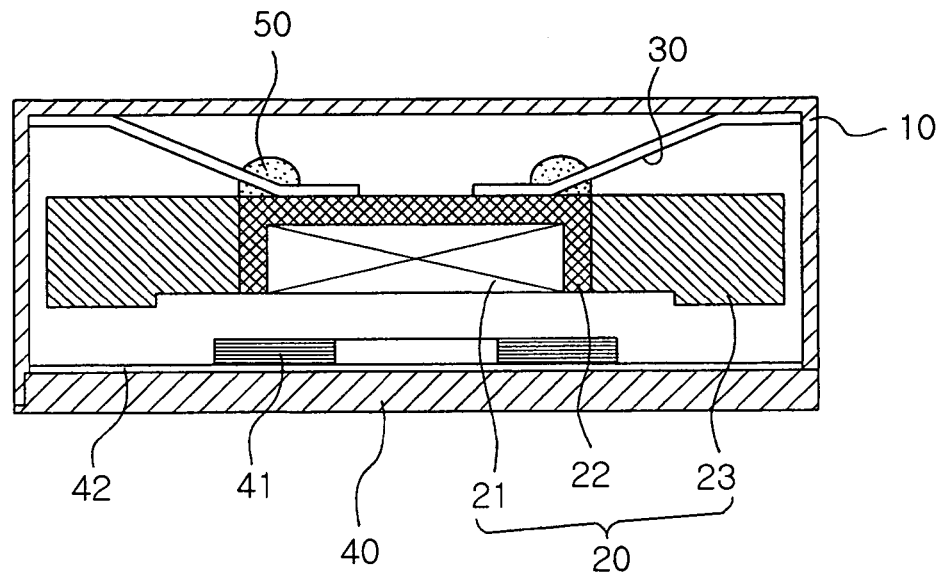
FIG. 4 is a sectional view of a linear vibration motor according to a preferred embodiment of the invention.
Figure 5:
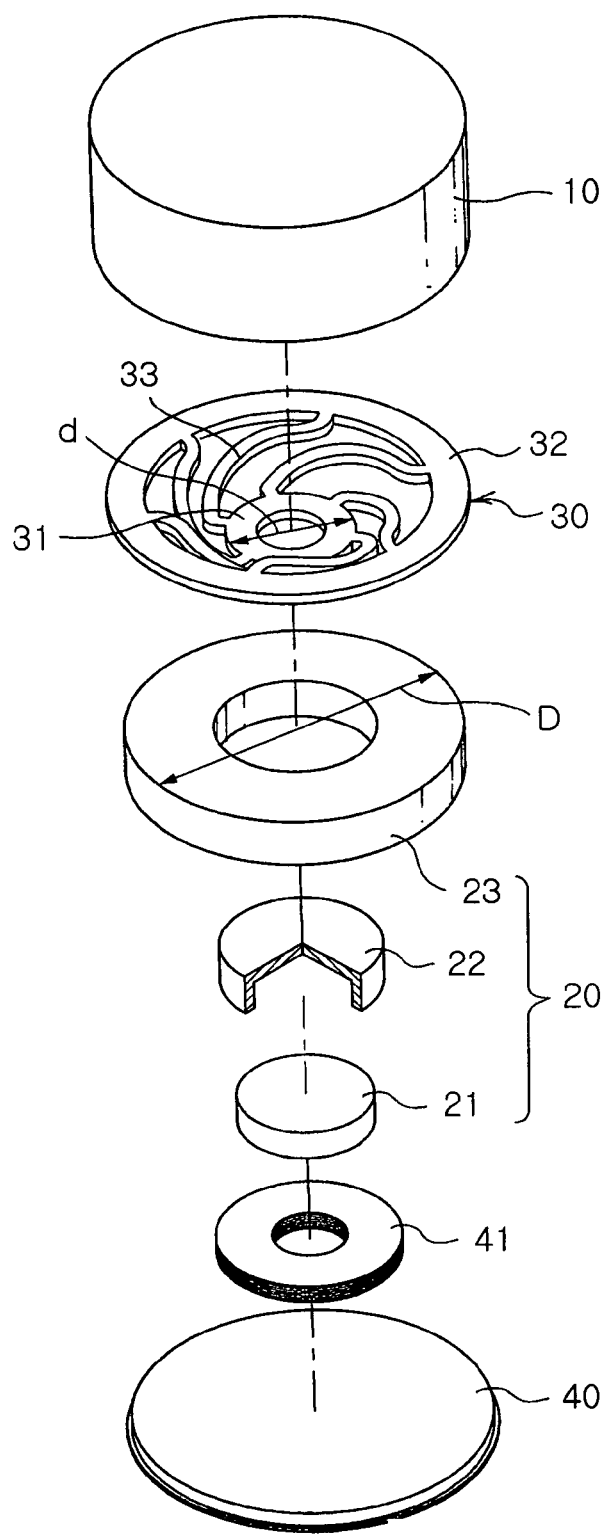
FIG. 5 is an exploded perspective view of the linear vibration motor in FIG. 4.

FIGS. 4 and 5 illustrate a linear vibration motor using resonance frequency of the invention, which will be described as follows.

The present invention pertains to a linear vibration motor which obtains vibration by using the vertical resonance of a movable unit through the interaction of a magnetic force from a magnet with an electromagnetic force of a specific frequency from a coil assembly, and generally includes a movable unit 20, a base assembly 40 and a housing 10.

The movable unit 20 has a magnet 21, a yoke 22 for housing the magnet 21 and a weight 23 of a specific mass surrounding the flank of the yoke 22. The weight 23 preferably has a specific gravity larger than that of iron. This as a result increases the mass of the movable unit in a fixed volume to adjust resonance frequency associated with the mass of the weight thereby to maximize the amplitude of vibration. (Refer to Equation 1 below.)

Also, at a bottom end formed in an outer periphery portion of the weight that does not correspond to the coil assembly, the weight is preferably extended toward the base assembly to increase the mass thereof. This configuration is also provided to increase the mass in a fixed volume to maximize vibration.

It is also preferred that the movable unit has at least one hole (not shown) for adjusting the mass of the movable unit to calibrate the unique frequency of the vibration motor.

The base assembly 40 is placed under the movable unit 20, and has a coil assembly 41 for generating a predetermined frequency. The coil assembly 41 is preferably placed under the movable unit 20.

The base assembly 40 preferably has terminals capable of being connected with an external board. As shown in FIG. 4, the base assembly 40 preferably has a Flexible Printed Circuit 42 (hereinafter will be referred to as 'FPC') laid thereon for connection with an input terminal and the coil assembly 41 placed on the FPC 42.

The linear vibration motor of the invention also includes an elastic member 30 connected with the movable unit 20 which creates maximum displacement at a resonance point to cause vibration when applied with a predetermined frequency.

Preferably, the elastic member 30 is of a leaf spring that is fixed at the outer periphery to the ceiling of the housing 10 and at the inner periphery to the top of the movable unit 20 opposed to the fixed inner periphery. The elastic member 30 is elastically deformed to the extent that the inner and outer peripheries can be shifted to a coplanar position from a parallel position where they are spaced for a fixed distance from each other. Alternatively, the elastic member 30 may be fixed at the outer periphery to the top of the base assembly 40 and at the inner periphery to the bottom of the movable unit 20 opposed to the fixed outer periphery. The elastic member 30 may be fixed to both the housing 10 and the movable unit 20 via various means such as bonding and welding.

Preferably, magnetic fluid 50 is formed on the top or bottom of the movable unit 20, which is connected with the inner periphery of the elastic member 30, in order to reduce contact noise originated from the linear vertical movement of the movable unit 20. The elastic member 30 will be described in more detail later with reference to FIG. 6.

According to the invention as described above, the elastic member is placed on the movable unit instead of being placed flush with the same in order to ensure a space capable of maximizing the mass of the weight 23. Also, the elastic member can be deformed to the extent that the inner and outer peripheries can be shifted to a coplanar position from a parallel position where they are spaced for a predetermined distance from each other in response to the vertical movement of the movable unit. As a consequence, the vibration motor of the invention can advantageously maximize the mass of the movable unit to obtain the greatest amplitude of vibration from a fixed volume.

FIG. 6 illustrate the elastic member of the linear vibration motor of the invention, which will be described as follows.

The elastic member 30 is connected with the movable unit as described above to create the maximum deformation at the resonance point to cause vibration. That is, the outer periphery 32 is fixed to the ceiling of the housing and the inner periphery 31 is connected to the top of the movable unit opposed to the fixed outer periphery 32, by which the elastic member 30 is deformed to the extent that the inner and outer peripheries can be shifted to a coplanar position from a parallel position where they are spaced for a predetermined distance from each other in response to the vertical movement of the movable unit.

Figure 6A:
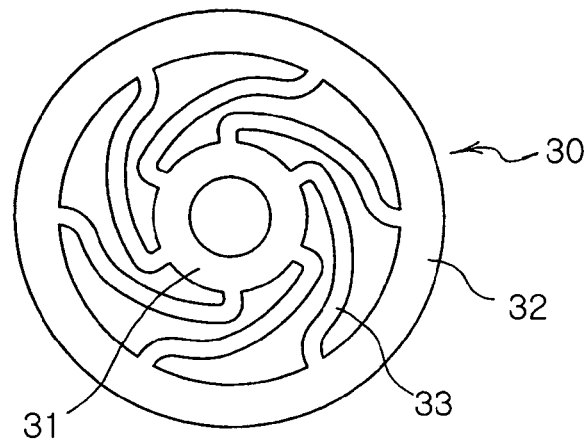
FIG. 6A is a plan view of an elastic member of the linear vibration motor in FIG. 4.
Figure 6B:
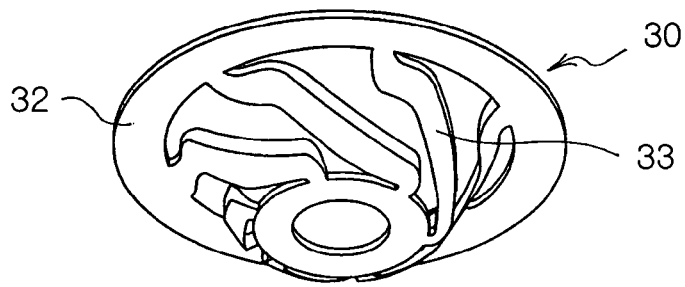
FIG. 6B is a bottom perspective view of the elastic member in FIG. 6A.
Figure 6C:
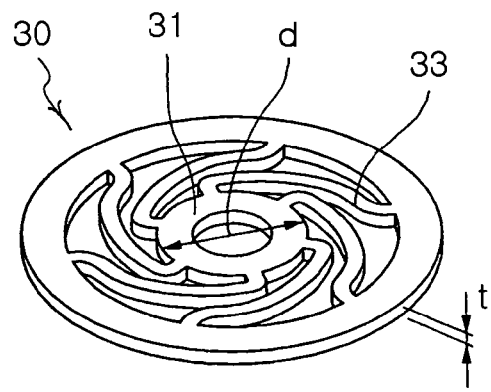
FIG. 6C is a top perspective view of the elastic member in FIG. 6B.

Describing the configuration of the elastic member 30 in detail with reference to FIGS. 6A to 6C, the elastic member 30 has an inner planar section 31 of a smaller diameter formed in a first plane and an outer planar section 32 of a larger diameter formed in a second plane that is spaced in parallel from the first plane. The elastic member also has at least two curved connecting sections 33 arranged at a specific interval for connecting the inner planar section 31 with the outer planar section 32 along curved lines. Amplitudes of vibration were measured by changing the number of the connecting sections, and experiment results are reported in Table 1 below:

TABLE 1

| Connecting sections of spring | Vibration |
|---|---|
| 2 | 0.22 |
| 3 | 0.50 |
| 4 | 0.50 |
| 5 | 0.50 |
| 6 | 0.50 |
| 7 | 0.50 |

As reported from Table 1 above, it can be construed that at least two connecting sections of the above type may be used to maximize the vibration.

In particular, when vertically driven by the movable unit as shown in FIG. 6C, the elastic member 30 can be deformed to the extent that the inner and outer planar sections 31 and 32 are placed on an equal plane from a parallel position spaced for a fixed distance from each other. That is to say, in the vertical movement of the movable unit from the parallel position as shown in FIG. 6B, the inner planar section 31 can be placed on the equal plane with the outer planar section 32 as shown in FIG. 6C if shifted to the largest distance, thereby occupying merely a space matching the thickness t of the elastic member 30 in a planar position.

Also, the connecting section 33 may be adjusted in width and length or the inner and outer planar sections 31 and 32 may be adjusted in diameter and area in order to regulate the elastic modulus of the elastic member 30.

Preferably, the diameter of the inner planar section 31 of the elastic member 30, that is, the inside diameter d of the leaf spring is determined about 15 to 70% of the outside diameter D of the movable unit 20 (refer to FIG. 5). If the inside diameter d of the leaf spring is less than 15% of the outside diameter D of the movable unit 20, the leaf spring is heavily distorted to the extent of obstructing the vertical movement of the movable unit 20. If the inside diameter d of the leaf spring is larger than 70% of the outside diameter D of the movable unit 20, the gap between the outside and inside planar sections 32 and 31 is decreased to shorten the connecting sections 33 of the leaf spring thereby potentially restricting the amplitude of vibration.

This will be apparent in conjunction with experiment results reported from Table 2 below and the graph in FIG. 7. The results were measured from a central portion of a 100 g jig while changing the inside diameter d of the leaf spring under equal conditions.

TABLE 2

| d/D* | Vibration |
|---|---|
| 0.05 | 0.22 |
| 0.08 | 0.23 |
| 0.10 | 0.24 |

TABLE 2-continued

| d/D* | Vibration |
|------|-----------|
| 0.13 | 0.25 |
| 0.15 | 0.50 |
| 0.20 | 0.50 |
| 0.25 | 0.50 |
| 0.30 | 0.50 |
| 0.40 | 0.50 |
| 0.45 | 0.50 |
| 0.50 | 0.50 |
| 0.55 | 0.50 |
| 0.60 | 0.50 |
| 0.65 | 0.50 |
| 0.70 | 0.50 |
| 0.80 | 0.23 |
| 0.90 | 0.22 | d/D*: Inside diameter of spring/outside diameter of movable unit

As reported in the graph associated with Table 2, it can be understood that the vibration has the maximum amplitude of about 0.50 when the inside diameter of the leaf spring is about 15 to 70% of the outside diameter R of the movable unit.

Figure 1:
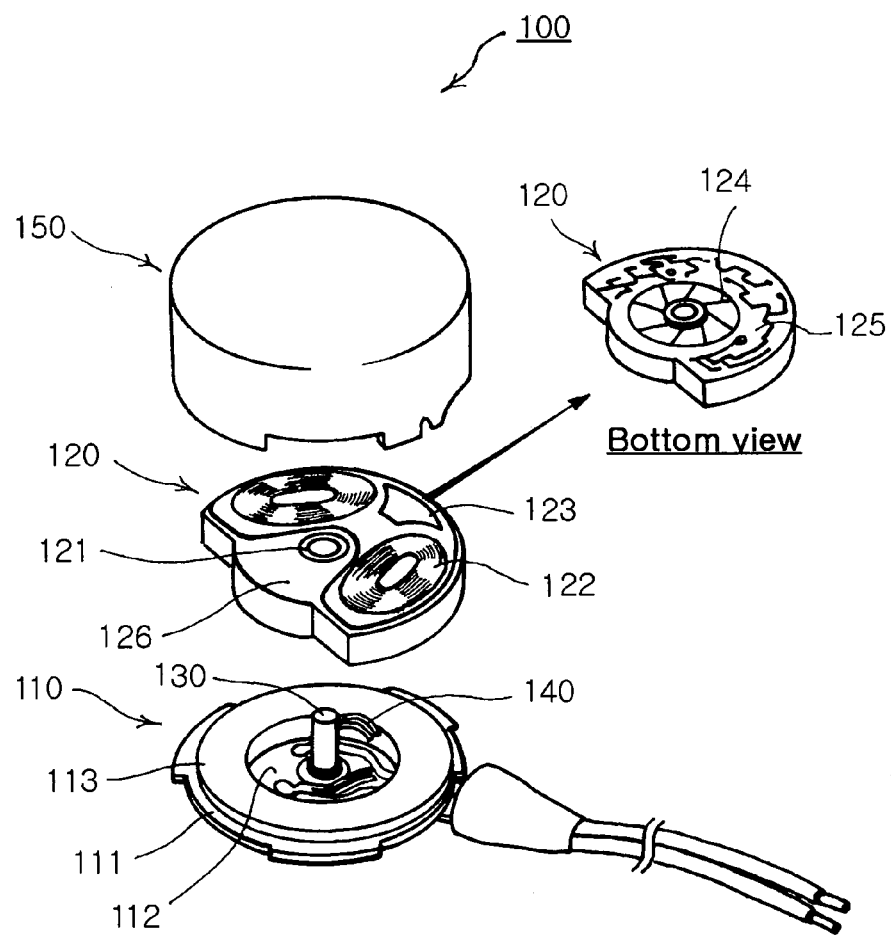
FIG. 1 is an exploded view of a conventional coin type vibration motor.
Figure 2:
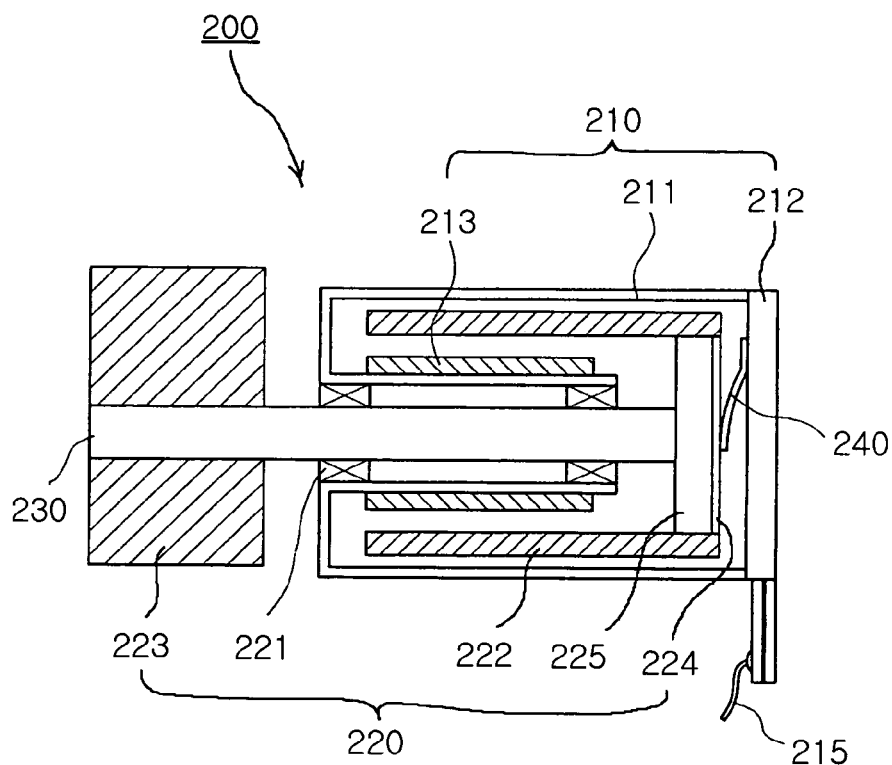
FIG. 2 is a sectional view of a conventional bar type vibration motor.
Figure 3:
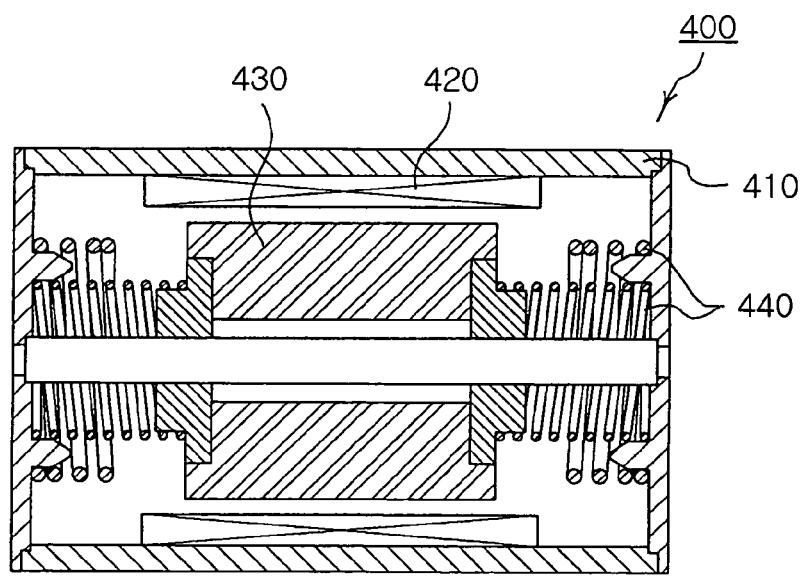
FIG. 3 is a sectional view of another conventional bar type vibration motor.

As described above, the elastic member of the invention fixed to the ceiling of the housing can be deformed to the extent that the inner and outer planar sections 31 and 32 are placed coplanar, thereby remarkably reducing its own area unlike a conventional vertical vibrator (refer to FIG. 2) in which an elastic member is placed coplanar with a magnet.

Then, the weight of the movable unit can be designed into a larger size thereby to maximize the amplitude of vibration.

Figure 8:
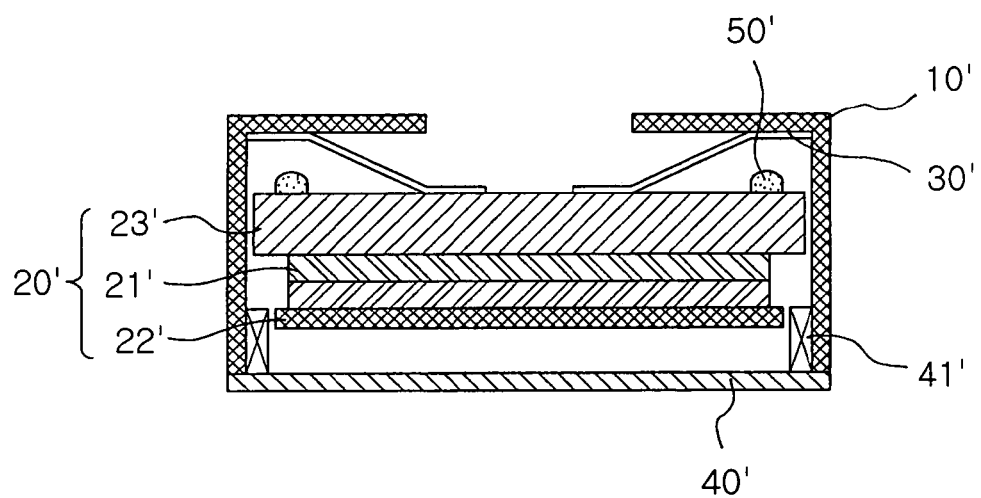
FIG. 8 is a sectional view of a linear vibration motor according to an alternate embodiment of the invention.

FIG. 8 is a sectional view of a linear vibration motor according to an alternate embodiment of the invention, which will be described as follows.

The linear vibration motor according to the alternate embodiment of the invention may include a movable unit 20', a base assembly 40' and a housing 10' made of a magnetic material.

The movable unit 20' includes a magnet 21', a yoke 22' placed under the magnet 21' to provide a route for a line of magnetic force and a weight 23' having a specific size and mass formed on the top of the magnet 21'. The weight 23' preferably has a specific gravity larger than that of iron to adjust resonance frequency associated with the mass of the weight thereby to maximize the amplitude of vibration.

The base assembly 40' has a coil assembly 41' for generating a specific frequency of electromagnetic force. The coil assembly 41' is preferably placed on the top of the base assembly 40' under the movable unit 20'.

Further, the base assembly 40' preferably has terminals capable of being connected with an external board.

The linear vibration motor also has an elastic member 30' that is so connected with the movable unit 20' which creates maximum displacement at a resonance point to cause vibration when applied with a predetermined frequency. Preferably, the elastic member 30' is fixed at the outer periphery to the ceiling of the housing 10' and at the inner periphery with the top of the movable unit 20' opposed to the fixed outer periphery. The elastic member 30' is elastically deformed to the extent that the inner and outer peripheries can be shifted to a coplanar position from a parallel position where they are spaced for a predetermined distance from each other. In this case, the elastic member 30' has a configuration the same as that described with reference to FIG. 6.

Preferably, magnetic fluid 50' is formed on the top of the movable unit 20', which is connected with the inner periphery of the elastic member 30', in order to reduce contact noises originated from the vertical movement of the movable unit 20'.

Figure 7:
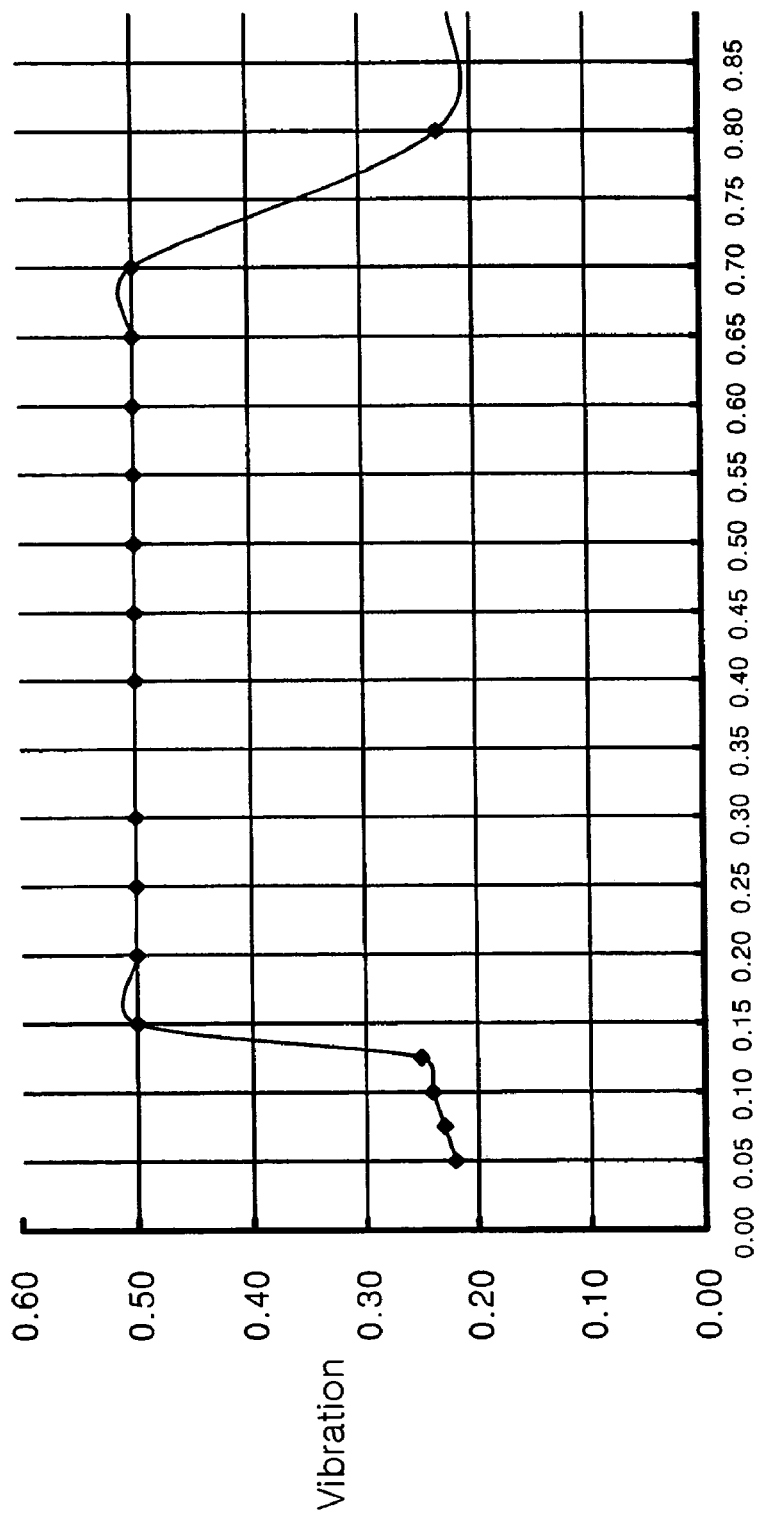
FIG. 7 is a graph illustrating the vibration change according to the ratio of the inside diameter of an elastic member with respect to the outside diameter of a movable unit in the linear vibration motor of FIG. 4.

This embodiment also can be applied with the experiment results of Table 2 and the graph of FIG. 7. That is, the inside diameter of the elastic member 30' is preferably determined about 15 to 70% of the outside diameter of the movable unit 20'. If the inside diameter of the elastic member 30' is less than 15% of the outside diameter D of the movable unit 20', the elastic member is heavily distorted to the extent of obstructing the linear vertical movement of the movable unit 20'. If the inside diameter of the elastic member 30' is larger than 70% of the outside diameter of the movable unit 20', the gap between outside and inside planar sections is decreased to shorten connecting sections of the leaf spring thereby potentially restricting the amplitude of vibration.

As described hereinbefore, the alternate embodiment of the invention can remarkably reduce the area occupied by the elastic member from a fixed volume, thereby allowing the weight to be increased in size. Further, the housing made of the magnetic material doubles as a yoke so that the size of the weight can be advantageously maximized.

Table 3 below reports the result of measurement for obtaining the amplitude of vibration per unit volume in the linear vibration motor of the invention and a conventional vertical vibrator.

TABLE 3

|  | Exam. 1* | Exam. 2** | Compared results |
|---|---|---|---|
| Volume (mm$^3$) | 1272.35 | 314.16 | Exam. 2** is at least quartered in size |
| Mass of movable unit (g) | 2.20 | 1.48 | — |
| Vibration (F) | 0.63 | 0.63 | — |
| Vibration per unit volume | 0.00050 | 0.00199 | Exam. 2** is at least 4 times superior |

Exam. 1*: Conventional vertical vibrator
Exam. 2**: Vibration motor of the invention A conventional vertical vibrator (refer to FIG. 2) with an elastic member being placed coplanar with a magnet and a vibration motor of the invention as shown in FIG. 4 were measured of volumes. As can be seen from Table 3, the volume of the conventional vertical vibrator was 1,272.35 mm$^3$, whereas the volume of the vibration motor of the invention was 314.16 mm$^3$. It is apparent that the volume of the vibration motor of the invention was at least quartered from that of the conventional vertical vibrator.

When measured with a measuring jig, both the conventional vertical vibrator and the vibration motor of the invention showed the same amplitude of vibration of 0.63.

The vibration per unit volume (F/mm$^3$) of the conventional vertical vibrator was 0.00050, whereas the vibration per unit volume of the vibration motor of the invention was 0.00199 proving at least 4 times larger than that of the convention vertical vibrator.

That is, it can be understood that the invention obtains a space sufficient to enlarge the mass of the movable unit thereby remarkably increasing the vibration per unit volume.

While the present invention has been described with reference to the particular illustrative embodiments, it is not to be limited thereto but will be defined by the appended claims.

Without a brush or a commutator, the brushless linear vibration motor of the invention can have effects of remarkably decreasing mechanical abrasion and the like while improving reliability and durability.

Further, the invention has a space capable of maximizing the weight to achieve an effect of maximizing vibration in a fixed volume.

Moreover, because the invention uses resonance frequency, the amplitude of vibration can be controlled according to frequency and rapid reaction can be made when the vibration motor is initialized or stopped.

What is claimed is:

1. A linear vibration motor using resonance frequency, comprising:
   a movable unit having a magnet, a yoke for housing the magnet and a weight having a predetermined mass for surrounding the flank of the yoke;
   a base assembly placed under the movable unit, and having a coil assembly;
   a housing for covering the base assembly and the movable unit placed over the base assembly;
   an elastic member being shaped as a leaf spring, the elastic member including an outer planar section fixed to a ceiling of the housing or a top of the base assembly, an inner planar section opposed to the outer planar section and connected to a top or bottom of the movable unit and at least two connecting sections for connecting the inner planar section with the outer planar section along curved lines, the inner planar section having a diameter matching about 15 to 70% of the outside diameter of the movable unit, and the elastic member being deformable to the extent that the inner and outer planar sections are shifted to a coplanar position from a parallel position where they are spaced for a predetermined distance from each other; and
   magnetic fluid formed on the top or bottom of the movable unit;
   whereby the movable unit vibrates vertically under the interaction between a magnetic force generated from the magnet and an electromagnetic force of a predetermined frequency generated from the coil assembly; and
   wherein the magnetic fluid reduces contact noises generated from the vertical vibration of the movable unit.

2. The linear vibration motor according to claim 1, wherein the weight has a specific gravity larger than that of iron.

3. The linear vibration motor according to claim 1, wherein the weight is extended toward the base assembly at a bottom end formed in an outer periphery portion thereof, which does not correspond to the coil assembly, to increase the mass thereof.

4. The linear vibration motor according to claim 1, wherein the base assembly has terminals capable of being connected with an external board.

5. A linear motor using resonance frequency, comprising:
   a housing made of a magnetic material;
   a movable unit including a magnet, a yoke placed under the magnet that provides a route for the passage of a line of magnetic force, and a weight attached on a top of the magnet;
   an elastic member being shaped as a leaf spring, the elastic member including an outer planar section fixed to a ceiling of the housing, an inner planar section opposed to the outer planar section and connected to a top of the movable unit and at least two connecting sections for connecting the inner planar section with the outer planar section along curved lines, the inner planar section having a diameter matching about 15 to 70% of the outside diameter of the movable unit, and the elastic member being deformable to the extent that the inner and outer planar sections are shifted to a coplanar position from a parallel position where they are spaced for a predetermined distance from each other;
   magnetic fluid formed on the top of the movable unit; and
   a base assembly contacting a bottom of the housing and placed under the movable unit,
   whereby the movable unit vibrates vertically under the interaction between a magnetic force generated from the magnet and an electromagnetic force of a predetermined frequency generated from the coil assembly; and
   wherein the magnetic fluid reduces contact noises generated from the vertical vibration of the movable unit.

6. The linear motor according to claim 5, wherein the weight has a specific gravity larger than that of iron.

* * * * *